United States Patent [19]

Villar

[11] Patent Number: 4,848,873

[45] Date of Patent: Jul. 18, 1989

[54] SHUTTER ADAPTED TO SELF LOCK IN CLOSED AND OPEN POSITIONS

[75] Inventor: Luis F. Villar, Westbury, N.Y.

[73] Assignee: Servo Corporation of America, Hicksville, N.Y.

[21] Appl. No.: 198,519

[22] Filed: May 25, 1988

[51] Int. Cl.[4] .................... G02B 26/02; E05D 11/10
[52] U.S. Cl. .................................. 350/266; 350/269; 16/319; 16/348
[58] Field of Search .................. 350/266, 269; 16/319, 16/341, 342, 344, 345, 348, 349; 250/505.1, 515.1; 354/226, 227.1, 234.1, 266, 268

[56] References Cited

U.S. PATENT DOCUMENTS

| | | | |
|---|---|---|---|
| 3,108,733 | 10/1963 | Tyrseck et al. | 229/122 |
| 3,545,005 | 12/1970 | Gallagher | 246/169 D |
| 4,432,609 | 2/1984 | Dueker et al. | 350/266 |

*Primary Examiner*—Bruce Y. Arnold
*Assistant Examiner*—Ronald M. Kachmarik
*Attorney, Agent, or Firm*—Kane, Dalsimer, Sullivan, Kurucz, Levy, Eisele and Richard

[57] ABSTRACT

The present invention relates to a shutter mechanism including a shutter adapted to rotate 45° from closed to open positions and which is self locking in both positions.

8 Claims, 2 Drawing Sheets

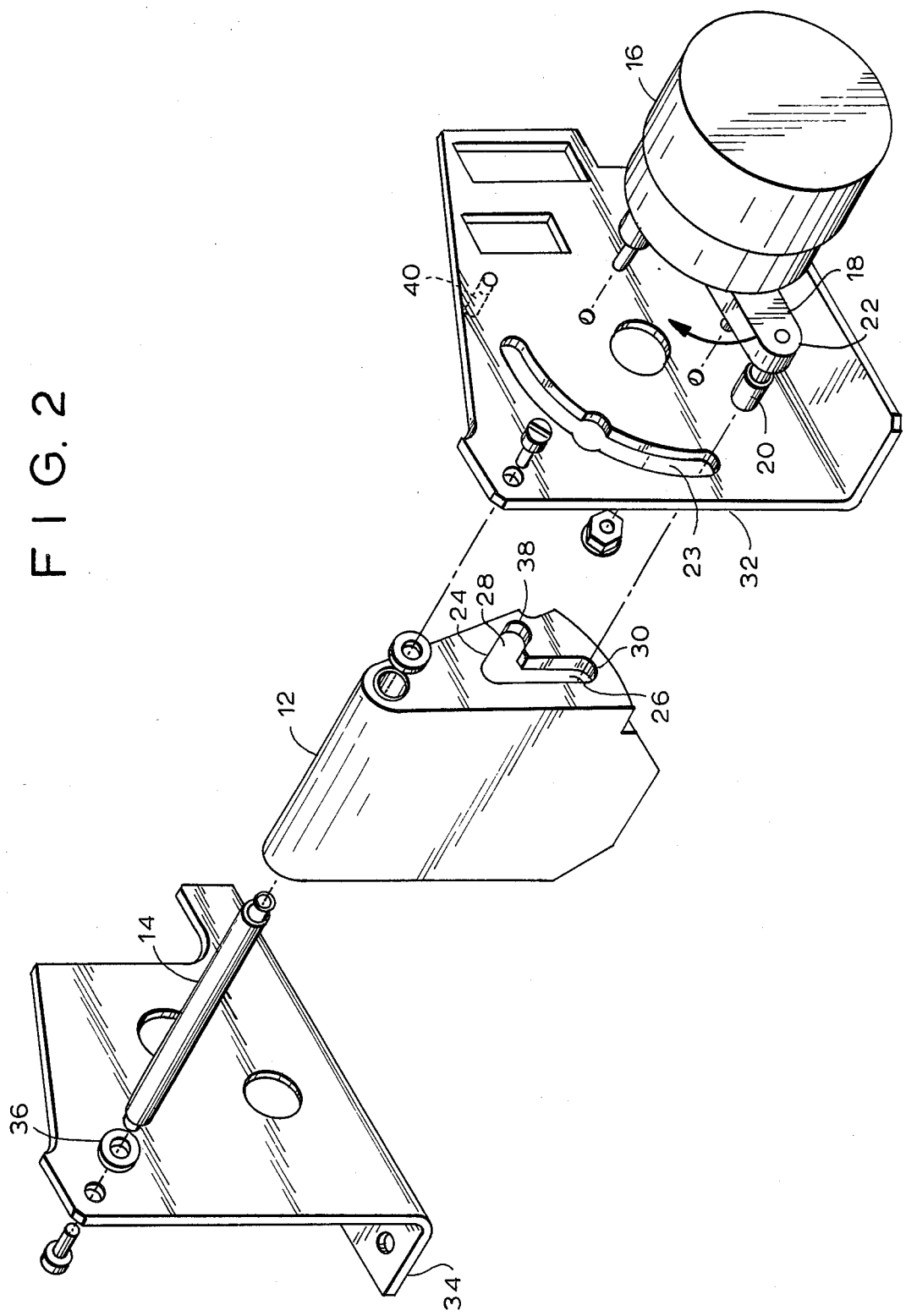

SHUTTER ADAPTED TO SELF LOCK IN CLOSED AND OPEN POSITIONS

BACKGROUND OF THE INVENTION

The present invention relates to shutter mechanisms and in particular to a shutter mechanism designed to operate in a harsh environment. Such shutters may be found, for example, on hot box detector scanners such as those disclosed in U.S. Pat. Nos. 3,108,733 and 3,545,005. Such scanners utilize infra-red sensors to scan and obtain heat readings of the bearings of moving railroad trains to look for overheated bearings that are in danger of failing. The scanners are usually mounted alongside railroad tracks and very often are in remote areas. As a train approaches the scanner, an appropriate signal is triggered to open the shutter thereby exposing the infra-red optics to the passing bearings. The shutter is necessary to protect the relatively sensitive optics from the environment, animals and vandals. Thus, the shutter should remain locked in the closed position until actuated to open whereafter the shutter should lock in the open position until train passage is complete and the shutter is activated to close. In view of the harsh conditions under which the shutter may be called upon to operate and because of the high degree of reliability demanded, the movement of the shutter should be relatively simple and the shutter actuation device should likewise be relatively simple and capable of being remotely actuated.

In view of the above, it is the principal object of the present invention to provide an improved shutter mechanism which is self locking in both its closed and open positions.

Another object is to provide such a shutter mechanism which is adapted to shift from one of its locked positions to the other of its locked positions upon actuation of a solenoid.

A still further object is to provide such a shutter mechanism wherein the shutter rotates between open and closed positions through an arc of 45° in response to solenoid actuation.

A still further object is to provide such a mechanism which may be utilized with conventional optic systems with little or no modification.

Summary of the Invention

The above and other beneficial objects and advantages are attained in accordance with the present invention by providing a shutter mechanism which includes a shutter adapted to rotate in a first direction from a closed position to an open position and a rotary solenoid adapted to rotate in the opposite direction. The shutter has an inverted V-shaped slot formed of upper and lower legs disposed in a plane which is perpendicular to the actuator of the solenoid when the shutter is in its closed position. The actuator has one end connected to the rotary solenoid and its opposite end is connected to a roller which is adapted to engage an end portion of the lower leg of the slot when the shutter is in its closed position to thereby lock the shutter in that position. When the solenoid is energized the actuator arm rotates in the second direction and in response thereto the roller moves along the slot of the shutter causing the shutter to rotate in the first direction until the plane of the slot is perpendicular to the centerline of the actuator and the roller engages an end portions of the upper leg thereby locking the shutter in its closed position until the actuator is de-energized and the process is reversed.

BRIEF DESCRIPTION OF THE DRAWINGS

In the accompanying drawings:

FIG. 2 is an exploded view of the shutter mechanism; and,

DETAILED DESCRIPTION OF THE PREFERRED EMBODIMENT

Figure 1:
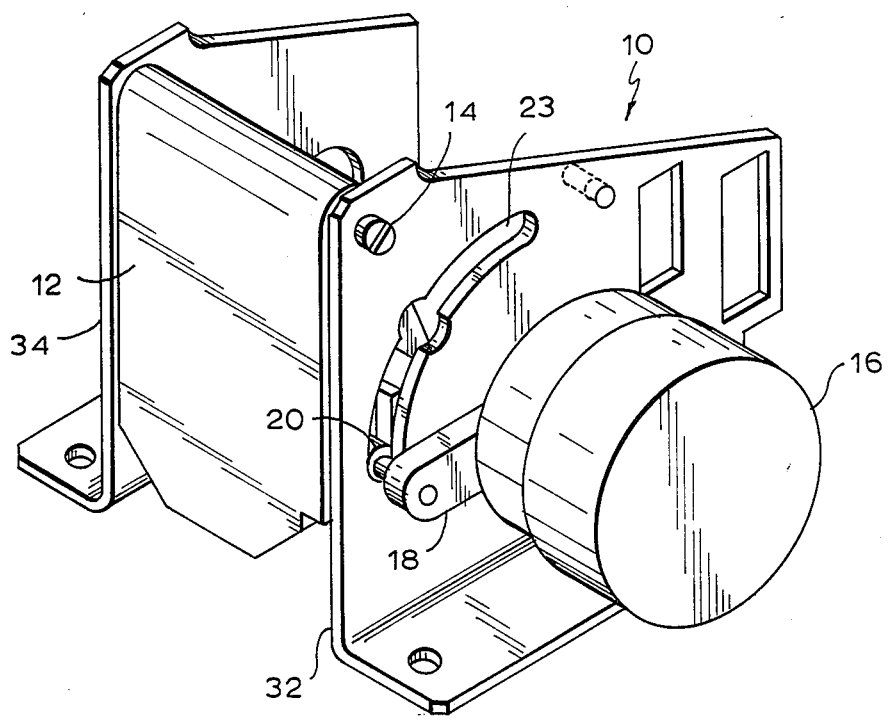
FIG. 1 is a perspective view of a shutter mechanism in accordance with the present invention.
Figure 3:
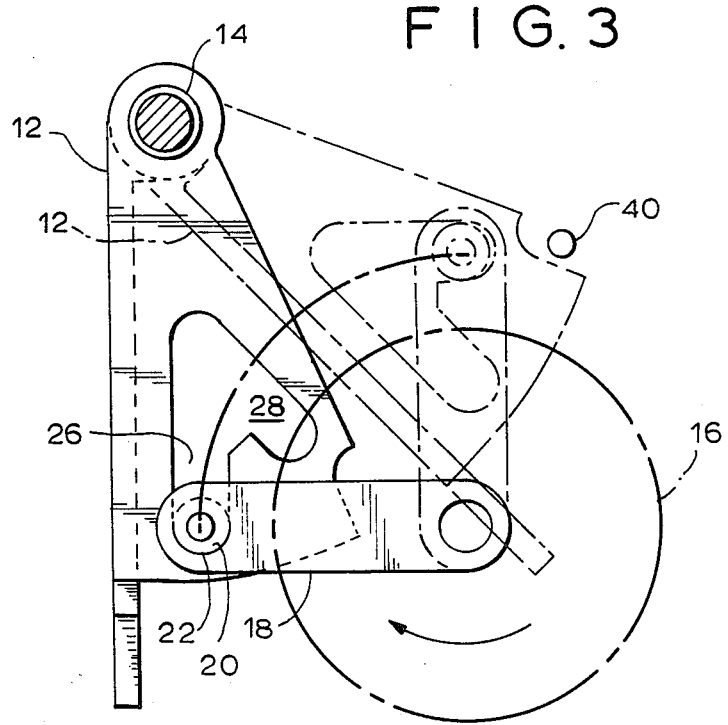
FIG. 3 is a schematic representation of the shutter mechanism.

Referring now to FIGS. 1-3 of the drawings, the apparatus 10 shown comprises a shutter 12 adapted to rotate about a stationary shaft 14 connected thereto, a rotary solenoid 16 and a solenoid actuator 18 connected at one end to the solenoid 16 and having a roller 20 mounted on its free end 22. The roller 20 extends through an arcuate cutout 23 in the bracket 32.

The shutter 12 has an inverted V-shaped slot 24 formed by a lower leg 26 and an upper leg 28 as shown in FIGS. 2 and 3. As shown in FIG. 3, in the shutter's closed position, the roller 20 on solenoid actuator 18 engages the end portion 30 of the lower leg 26 of the shutter slot 24. The center line axis of the slot 24 is perpendicular to the center line of the solenoid actuator 18. Any force tending to open the shutter 12 is limited by the solenoid shaft by way of the solenoid actuator 18.

The mechanism 10 further comprises a solenoid bracket 32 upon which the rotary solenoid 16 is mounted and an end bracket 34 to which one end of the stationary shaft 14 is connected to by means of a spacer 36 a shown in FIG. 2.

The invention operates as follows:

Energizing the rotary solenoid 16 causes the solenoid actuator 18 to rotate 90° in a clockwise direction as shown in FIG. 3. This clockwise rotation of the solenoid actuator 36 causes the shutter 12 to pivot about stationary shaft 14 and rotate in a counterclockwise direction to its open position where the roller 20 engages the end portion 28 of the upper leg 28 of the slot 24, locking it in place (see FIG. 3). In this position the center line axis of the slot 24 is perpendicular to the center line of the solenoid actuator 18. Thus, the shutter 12 is again locked in place due to the engagement of the roller 20 against the end portion 38 of the upper leg 28 of the slot 24 as shown in FIG. 3. The shutter 12 can only be open if the rotary solenoid 16 is deenergized.

A limit stop pin 40 prevents the shutter 12 from overshooting its closed position due to the rapid acceleration imparted by the solenoid actuator 16. If the pin 40 were not present the roller portion 20 might engage the wrong leg, and thus leave the shutter 12 in an undesirable, overextended position.

What is claimed is:

1. A self locking shutter mechanism comprising:
   a shutter adapted to rotate between a closed position and an open position, said shutter including surfaces containing an inverted V-shaped slot formed of two adjoining legs;
   a rotary solenoid adapted to rotate in a direction opposite to the rotational direction of said shutter;
   a solenoid actuator having one end connected to said rotary solenoid and a second end;
   a roller mounted to said actuator second end;

said slot having a center line axis which is perpendicular to a center line of said solenoid actuator when said shutter is in its closed position;

said roller being adapted to engage an end portion of one leg of said slot in said shutter closed position thereby locking it therein wherein, upon energization of said solenoid, said solenoid rotates, and said roller, in response thereto, moves along said slot causing said shutter to rotate in the opposite direction until the center line axis of said slot is perpendicular to the center line of said solenoid actuator and said roller engages an end portion of the other leg of said slot thereby locking said shutter into its open position until said rotary solenoid is deenergized and said shutter is caused to rotate back to its closed position.

2. A self locking shutter mechanism according to claim 1 wherein said rotational solenoid rotates 90° and said shutter rotates 45° from its closed to its open positions.

3. A self locking shutter mechanism according to claim 1 further comprising a limit stop pin for restricting the rotational movement of said shutter to its open position thereby inhibiting the roller from engaging the wrong leg of the slot and causing said shutter to be left in an overextended position.

4. A self locking shutter mechanism according to claim 1 further comprising a stationery shaft, said shutter being pivotally connected thereto for rotation thereabout in said first direction.

5. A self locking shutter mechanism according to claim 1, further comprising a solenoid bracket, upon which said rotary solenoid is mounted.

6. A self locking shutter mechanism according to claim 5 wherein said limit stop pin is connected to said solenoid bracket.

7. A self locking shutter mechanism according to claim 5 wherein said roller is connected at one end to said solenoid bracket.

8. A self locking shutter mechanism according to claim 5 further comprising an end bracket, said stationary shaft being connected thereto.

* * * * *